Figure 1:
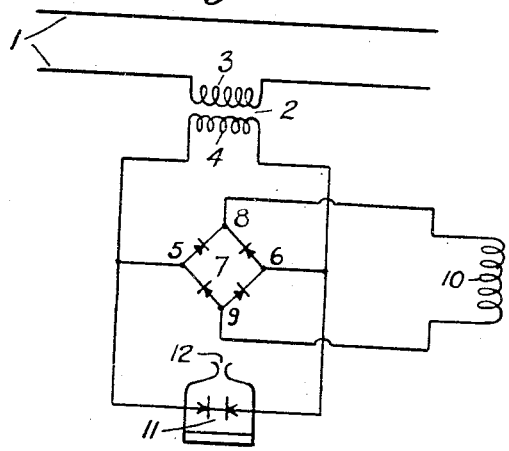

Oct. 21, 1941.                S. A. STEVENS                    2,260,200
            INDUCTIVE LOAD CIRCUIT SUPPLIED WITH RECTIFIED
                    ALTERNATING ELECTRIC CURRENT
                        Filed March 8, 1940

INVENTOR
Sydney Arthur Stevens.
BY
HIS ATTORNEY.

Patented Oct. 21, 1941

2,260,200

UNITED STATES PATENT OFFICE 2,260,200

INDUCTIVE LOAD CIRCUIT SUPPLIED WITH RECTIFIED ALTERNATING ELECTRIC CURRENT

Sydney Arthur Stevens, King's Cross, London, England, assignor, by mesne assignments, to The Union Switch and Signal Company, Swissvale, Pa., a corporation of Pennsylvania Application March 8, 1940, Serial No. 322,989
In Great Britain June 20, 1939

1 Claim. (Cl. 175—363)

This invention relates to inductive load circuits arranged to be supplied with uni-directional currents derived from alternating currents of the usual periodically varying wave form through rectifying apparatus of the dry surface contact type and has for its object to provide arrangements for preventing injury to the rectifying apparatus due to the excessive voltages developed during operation.

When an inductive circuit, such for example, as a field winding of an alternating current generator or synchronous motor arranged to be supplied (for automatic regulation purposes) with uni-directional current derived from the alternating current source traversing the load or supply circuit of the generator or motor through a rectifier, the current input to the rectifier is of the usual sinusoidal wave form, but the current in the inductive circuit will only vary very slightly during a cycle due to the inductance of the circuit. As a result, relatively high voltage peaks will occur during each wave cycle which impose corresponding severe stresses on the rectifier. These periodic excessive voltages occurring in each cycle may be arranged to be prevented by a suitable designed condenser connected in parallel with the load circuit, but when the mean value of the current in the inductive load circuit is varied as, for instance when the motor is started into operation or its load is suddenly increased, then even higher transient voltage stresses are set up which are in general indeterminate, being dependent, amongst other conditions, upon the point in the cycle at which the variation of the load circuit current is effected. In the case of an alternating current generator, similar sudden increases in current can arise when the load is suddenly thrown on the alternator, or when a fault occurs on the network supplied by the generator. These voltage stresses are liable to cause the break-down of the rectifier so as to destroy its resistance in the reverse direction so that the rectifier becomes inoperative and may even be destroyed.

According to the principal feature of the invention, a safety device is provided in the form of a relatively small dry surface contact rectifier device adapted to break down so as to become electrically conductive under an impressed voltage which is substantially less than that required to break down the main rectifier, the safety device being connected in parallel with the main rectifier and preferably so mounted as to be readily removable from the circuit, and when removed, to cause the main rectifier to be automatically short-circuited.

In carrying the invention into practice, the safety device preferably comprises a small dry surface contact rectifier unit consisting of two oppositely connected rectifier discs or sets of discs mounted in a suitable tube or casing and provided with contact terminals at each end adapted to engage in suitably mounted spring clips in a similar manner to a cartridge type fuse. These clips are permanently connected to the terminals of the main rectifier and are also provided with contact springs projecting towards one another so as to overlap and arranged to be maintained out of electrical engagement with one another by a projection on the safety device when the latter is inserted into position in the spring clips.

In operation, so long as the voltage developed at the terminals of the main rectifier and thus applied across the spring clips and the safety device is not abnormal, the safety device is not traversed by any appreciable current owing to the opposing action of the rectifier elements of which the device is composed.

When however, the voltage developed at the terminals of the main rectifier and of the device attains a predetermined value corresponding to the break-down voltage of the safety device, the latter becomes operative and permits the passage of current in both directions, thereby short-circuiting and thus preventing injury to the main rectifier.

Under these conditions the safety device must be removed and replaced by a fresh device, the main rectifier being short-circuited by the action of the contact springs above described until this replacement has been effected.

Figure 2:
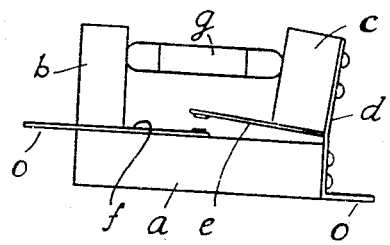
Figure 3:
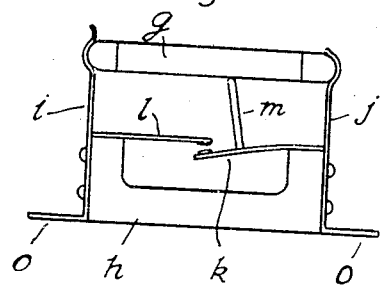

In order that the present invention may be readily understoood, it will now be described by way of example with reference to the accompanying drawing in which, Figure 1 is a circuit diagram of an arrangement embodying the invention, and Figures 2 and 3 are somewhat diagrammatic views illustrating the construction of two devices suitable for use in connection with the invention.

Referring now first to Figure 1, the conductors of a circuit through which alternating current is supplied from a generator or to a synchronous motor are shown at 1, a current transformer 2 having its primary winding 3 connected in series in one of the conductors 1.

The terminals of the secondary winding 4 of the transformer 2 are connected to the input terminals 5, 6 of a main bridge-connected dry surface contact rectifier device 7, the output terminals 8, 9 of which are connected to the terminals of a field winding 10 of the generator or motor (not shown).

Connected across the terminals of the secondary winding 4 and of the transformer 2 in parallel with the main rectifier device 7 is a safety device 11 comprising as shown two oppositely connected rectifier elements of the dry surface contact type.

A pair of spring contacts 12 are provided which are normally held apart from one another so long as the safety device 11 is in position in a clip device provided therefor, the contacts 12 being arranged to come into electrical contact with one another so as to short-circuit the main rectifier device 7 and the secondary winding 4 when the safety device 11 is removed.

The device 11 is so designed as to withstand only a voltage which can be safely applied to the main rectifier device 7, but in the event of any higher voltage being developed at the terminals 5, 6 of the rectifier device 7, the rectifier elements of the safety device 11 are broken down and the main rectifier 7 is short-circuited and thereby prevented from being injured.

Under these conditions, the safety device 11 may be removed for replacement and until this has been effected the main rectifier device 7 will remain short-circuited by the contacts 12 as above explained, the field winding 10 being inoperative for the time being.

Figures 2 and 3 illustrate in detail two arrangements for this purpose. In the arrangement illustrated in Figure 2, the safety device comprises a rectifier cartridge $g$ similar in appearance to a cartridge fuse and clamped between a contact block $b$ fixed to an insulating base $a$ and a movable contact block $c$ which is resiliently supported on the base $a$ by means of a leaf spring $d$ and provided with a contact blade $e$ adapted to co-operate with a fixed contact element $f$, the latter being electrically connected to the fixed contact block $b$. When a rectifier cartridge $g$ is mounted as shown between the contact blocks $b$ and $c$, the contact blade $e$ is held in a position in which it is out of engagement with the fixed contact element $f$, but when the cartridge $g$ is removed, the spring $d$ will move the contact block $c$ in an anti-clockwise direction, so as to permit the contact blade $e$ moving into engagement with the contact element $f$, thus automatically short-circuiting the main rectifier device 7, the input terminals 5, 6 of which are permanently connected to the terminals $c$ of the contact blocks $b$ and $c$.

The same result is achieved in a somewhat different manner in the construction illustrated in Figure 3, in which the movable contact is constituted by a resilient blade $k$ on which a pin $m$ is rigidly mounted so as to be engaged by a rectifier cartridge $g$ inserted in the clips $i$ and $j$ and thus deflect the blade $k$ out of engagement with a fixed contact blade $l$, a suitable recess being provided in the base $h$ for permitting this movement of the blade $k$. It will be observed that in this construction any type of clip may be utilised, since the actuation of the contact blade $k$ is independent of any movement of the clip elements.

The invention is particularly applicable to the inductive load constituted by a field winding of an alternating current generator or synchronous motor, this winding being supplied with unidirectional current through a current transformer and a rectifier for the purpose of effecting series compounding of the generator or motor. The invention may however, also be applied to circuits embodying an inductive load of other character and supplied with current in a similar manner for protecting the main rectifier from liability to injury by transient excessive voltage stress.

Having now particularly described and ascertained the nature of my said invention and in what manner the same is to be performed, I declare that what I claim is:

A safety device for an inductive load circuit supplied from an alternating current source through a main rectifier, said device consisting of a pair of relatively small dry surface contact rectifier units connected in series in a direction to oppose one another across the input terminals of said main rectifier, said rectifier units being adapted to break down so as to become electrically conductive under an impressed voltage from said source which is substantially less than that required to break down said main rectifier, a mounting for said rectifier units which renders said safety device readily removable, and means effective when said safety device is removed for causing said main rectifier to be automatically short-circuited, for the purpose specified.

SYDNEY ARTHUR STEVENS.